United States Patent Office 3,392,573
Patented July 16, 1968

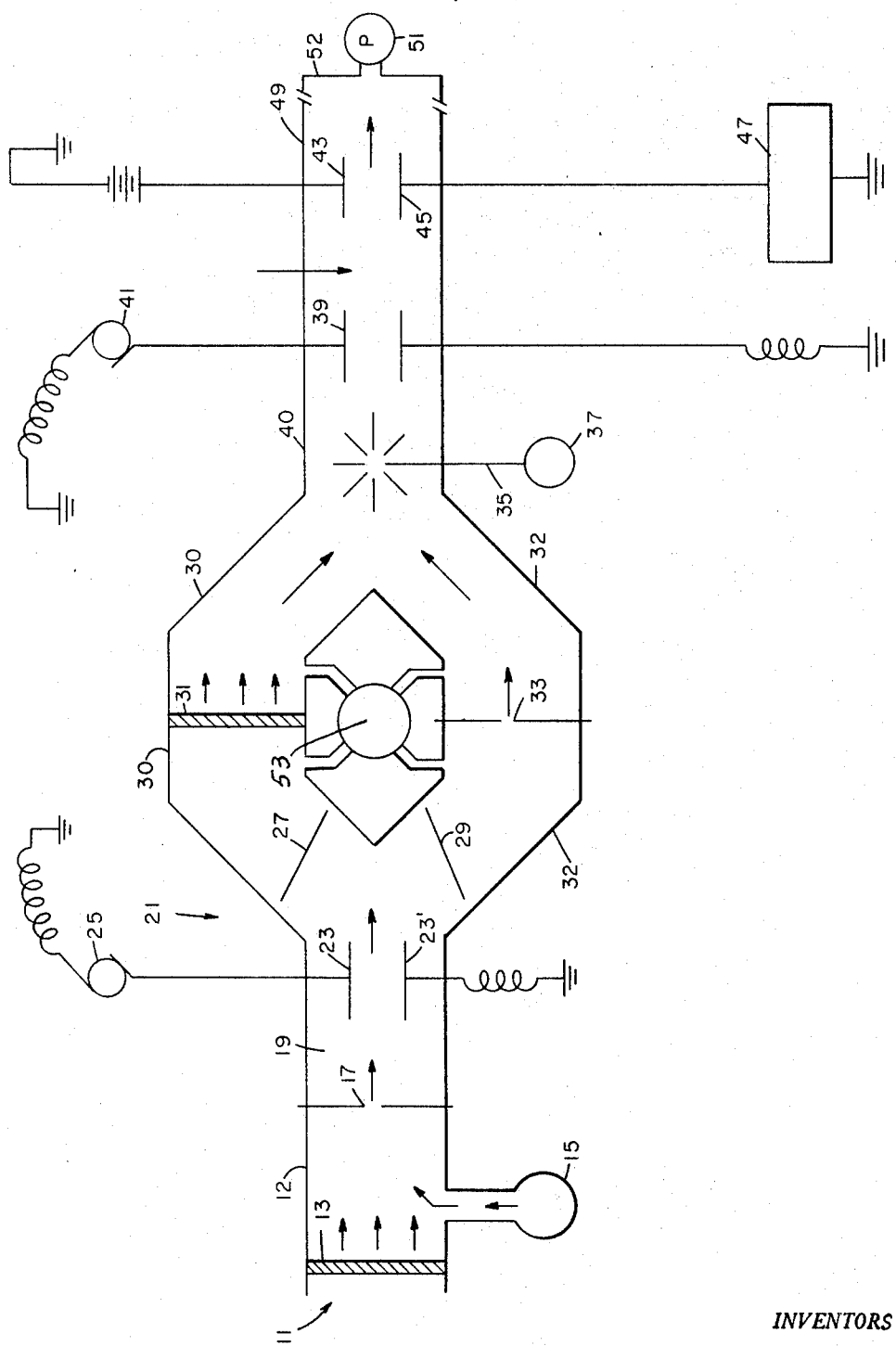

3,392,573
AEROSOL FILTER TEST DEVICE
Arthur L. Benson, Concord, Walter J. Smith, Arlington, and Norman F. Surprenant, Littleton, Mass., assignors to the United States of America as represented by the United States Atomic Energy Commission
Filed Sept. 7, 1966, Ser. No. 577,780
7 Claims. (Cl. 73—38)

ABSTRACT OF THE DISCLOSURE

A laboratory method and apparatus for determining the nature and suitability of filter media for sampling small particles under the special conditions at high altitudes with high collection velocities wherein electric charges are produced on the particles for measuring the particle concentration upstream and downstream of the filter media.

This invention was made in the course of, or under a contract with the United States Atomic Energy Commission.

Prior art

Small particles are conventionally sampled or removed from a gas stream by collection on filter means through which the gas passes, and of the several sampling and removal approaches available, an open fiber collecting system appears to offer a practical route to a fully successful particle collection system for high altitude applications. Media of this type may be in the form of metal mesh woven structures, metal felts, ceramic fiber structures, whether woven or randomly laid as dry webs or wet-formed papers, or various structures formed of cellulose fibers and the like.

Material collected on the fiber may be recovered by liquid extraction or the filter structure may be selectively destroyed, leaving the collected material for analysis. If the latter procedure is followed, it is necessary, of course, that the filter material be pure and susceptible to some reaction that will remove it completely. Thus, a pure cellulose fiber may be quantitatively oxidized and volatilized away as carbon dioxide and water. A pure silica filter may be treated with hydrofluoric acid and vaporized away as silicon tetrafluoride. Metal fibers have the advantage of being cleanable to a high degree, in which case washing removes the collected material for re-use of the filter.

A test facility to determine the performance of an air filter or filter medium sample must meet the basic requirements of: a test environment stream representing the conditions under which the filter is to perform, means for holding the filter or specimen in the test environment stream, an aerosol source of known characteristics with regard to particle size and nature, means for introducing the aerosol into the test system upstream of the sample filter, means for sampling the aerosol and assaying the particle count thereof upstream and downstream of the filter, and means for measuring air flow rates, pressure differentials and absolute pressures in the system. Means for assaying the aerosol has been particularly difficult, time-consuming or ineffective heretofore.

Various ideas have been proposed and used for producing 50-1000 A. diameter test particles and for counting them. One suggestion is that dilute dye solution be atomized and dried to produce particles of the desired size and that the dye particles be assayed by collection on a filter and estimated by color intensity. A simple calculation, however, shows that this method requires impossibly long sampling periods due to the large volume of water or other solvent vapor that must be introduced into the system.

It has also been proposed to produce a metal aerosol by means of a heated or exploded wire or by electric discharge between appropriate electrodes. It is expected that in a test of this kind the metal particles would be collected on a filter and assessed for quantity by analysis in one way or another. Here, however, it has been difficult or impossible to analyze the minute amount of collected matter in a large mass of filter material with sufficient accuracy to make a reliably efficient measurement.

Another proposal makes use of radioactive radioisotopes as tracer materials to determine the presence and quantity of test particles. Each run of this kind requires careful planning and scheduling so that "tagged" metal or alloy can be prepared in suitable form and used within the useful life period of the isotope. This approach, however, presents inconveniencies, radiation hazards and involves many individual, time consuming, and non-continuous operations.

Another method is the use of a condensation nuclei meter. Here a sample of the low pressure aerosol is compressed to near atmospheric pressure, mixed with clean air, saturated with moisture, then expanded enough to produce a condensation on the nuclei. Counts are made on an optical counter system. This system however, is cumbersome, expensive, and time consuming. Moreover, inherent sources of error are loss of particles in transfer of the aerosol sample from 1 mm. pressure in the test system to atmospheric pressure in the condensation nuclei counter, and the possible accidental introduction of particles in the "clean" air stream.

Likewise, direct indication of the aerosol particles by light scattering is not feasible because of the minute size of particles and the small number thereof.

It is an object of this invention, therefore, to provide those skilled in the art with a simple, economical and safe method of evaluating filter material for small particles for use at altitudes of over 100,000 feet, at pressures of one millimeter of water or less, with flow velocities of hundreds to thousands of feet or more per minute, and at particle diameters of a few hundred angstroms or less.

It is another object of this invention to provide a simple, economical and efficient system for assaying aerosol particles in such environments, so as to evaluate the filter media.

Description of the invention

This invention assays the aerosol by a convenient and relatively simple technique wherein an electric charge concentration produced on the individual particles is measured upstream and downstream of the test filter media. More particularly this invention contemplates a filter, and relative thereto, upstream and downstream assaying of an electrically neutral particle laden gas stream, wherein the particles are charged under the desired conditions, passed through charged collector plates, and the rate of particle collection on these plates is measured with a sensitive measuring device. In one embodiment, this invention comprises introducing an aerosol into a clean gas stream, passing the particle laden air through a critical flow orifice and into a low pressure chamber on the downstream side of the orifice, electrostatically removing the charged particles from the gas stream produced by the orifice thus to provide an electrically neutral aerosol, causing the neutral aerosol to flow through a test filter and into a charging device, trapping excess charged particles produced by the charging device, collecting the charged particles remaining on charged collecting plates, measuring the rate of collection with a sensitive electrometer, exhausting the air stream into a large ballast tank having a continuously operating high vacuum pump while measuring the pressure drop across the test filter, and correspondingly measuring the rate of collection on the collection plates of the particles from the particle laden gas stream by bypassing the neutral aerosol around the test filter. With the proper selection of components and their operation, as described in more detail hereinafter, the desired particle laden gas stream aerosol assaying and filter test means is provided.

The above and further objects and novel features of this invention will appear more fully from the following detailed description when the same is read in connection with the accompanying drawings. It is expressly understood, however, that the drawings are not intended as a definition of the invention but are for the purposes of illustration only.

Referring to the figure, which is a partial cross-section of the apparatus of this invention illustrating the principles of the method thereof, room air enters at the left side of the apparatus shown through opening 11 in conduit 12 and passes through the absolute filter 13. Aerosol particles in the size range of 50 to several hundred angstroms diameter are generated by generator 15 and introduced into the air stream in conduit 12. The particle laden air passes through a critical flow orifice 17 into low pressure chamber 19 in conduit 12 on the inside of the test apparatus 21. In chamber 19, electrostatic collection plates 23 and 23' having a suitable electrical energy source 25, remove the charged particles produced by the orifice to provide an electrically neutral particle laden gas stream in chamber 19. By the proper arrangement of the valves 27 and 29, the neutral aerosol stream is caused to flow through arm 30 of test means 21 and the test filter 31 therein. Those particles not arrested by the filter pass on through arm 30 and conduit 40 having therein a charging or high potential electrode device 35 which includes a suitable electrical energy source 37. Any excess ions produced by the high potential of electrode 35 are removed by ion trap 39 in conduit 40 of test means 21, the trap 39 having a suitable electrical energy source 41. The remaining charged particles then collect on charged plates 43 and 45 in conduit 40 in test means 21, while the rate of this collection is measured by electrometer 47.

The air stream exhaust into a large ballast tank 49, partially shown for ease of explanation, which is connected to test means 21. To this end a continuously operating vacuum pump 51, at the opposite end 52 of tank 49 from conduit 40, provides the desired low pressure in the ballast tank 49, and thus test apparatus 21, and the desired high flow velocities in test means 21, while the pressure drop across the test filter 31 is measured by McLeod gage 53. Advantageously the air stream in at opening 11 in conduit 12 is substantially constant, but this may be suitably adjusted for conditions at different altitudes and gas velocities by varying the pumping speed of vacuum pump 51 and/or the size of the critical flow orifice 17.

After a reading has been taken on the electrometer 47 of the particles passing through the test filter, valves 27 and 29 in arms 30 and 32 respectively, remotely operate to pass the air stream in test means 21 through by-pass arm 32 and variable orifice 33 therein. The adjustments thereof vary the pressure drop across the orifice 33, which as measured by gage 53, equals that previously measured across the test filter 31. The arms 30 and 32 and the filter 31 and orifice 33 are equivalent and thus the pressure and flow velocity therein are alike and correspond to the deemed high altitude test conditions. The measurement of the charges carried by the by-passed particle laden stream are then taken as before.

Under steady conditions, the ratio of the electrometer reading upon flow through the test filter 31 and through the variable orifice 33 is the measure of the aerosol concentration upstream and downstream of the filter and the aerosol penetration of the test filter 31. It is noted that the filter sample additionally can be measured by mechanically separating the filter 31 from the test means 21 and separation of the filtered sample from the filter 31 by chemical means, such as described above.

In operation the aerosol is generated in the initially filtered particle free air at 1 atmosphere by controlled evaporation and condensation of silver chloride, such as described in Discussions of the Faraday Soc. 30, 178–184 (1960) and J. Colloid Sci., 17, 26–38 (1962) and 19, 223–237 (1964). This aerosol is introduced into the low pressure test system 21 through critical flow orifice 17, the downstream side of which equals the desired test pressure and flow of interest at 100,000 to 200,000 feet altitude. The test system, comprises absolute filter 13 in a first conduit connected for uniform selective flow through filter leg 30 and filter by-pass leg 32, wherein the test aerosol is pumped at low pressures by vacuum pump 51. The charged electrostatic precipitator plates 23 and 23' remove charged particles upstream of the filter 30 so that filtering and other testing downstream of these precipitator plates is performed with electrically neutral particles. The aerosol detector, mounted downstream of test filter 31 and by-pass 32, consists of a particle charger, such as described in Artifical Stimulation of Rain 122–130, Pergamon Press (1957), U.S. Patent 2,986,923, AFCRL 62–233, Arthur D. Little, Inc., Jan. 31, 1962, and U.S. Patent 3,178,930. The ion eliminator or trap filter 39, such as described in the last two above-mentioned references, removes ions smaller than the size range to be measured, and the electrostatic precipitator plates 43 and 45 connected to the electrometer measures the ion current produced by the charged particles in the size range of interest. Suitable electrometers are described in J. Colloid Sci. 17, 91–100 (1962); Proceedings of the IEE, 107, Part A, 353 (August 1960) and Ind. Hyg. J. 555 (November-December 1963). The upper size limit on the precipitated particles is determined by the geometry of the plates, the voltage across the plates and the aerosol pressure and velocity, which all can easily be adjusted by suitable electrical control means to produce uniform precipitation as desired.

This invention has the advantage of making possible the rapid evaluation of filter media for removing 10–1000 A. diameter particles from the atmosphere at altitudes of 100,000 to 200,000 feet. This provides the advantage of determining the nature of filter media, of determining small changes in filter performance and in demonstrating desired design changes for the rapid development of laboratory testing and filter equipment. Moreover, the aerosol generator, vacuum pump, test system and aerosol detector of this invention provide electric, charge sensitive, assaying means, wherein the aerosol concentration is measured upstream and downstream of the test filter with ease, accuracy and efficiency in the desired test environment. Actual tests have shown that this fulfills a long felt need in providing means for understanding the mechanisms of filter efficiency and particle collection, particularly on the role of electrostatic charge on the particle and/or its collecting surface, at pressures less than 1 millimeter, flow velocities of hundreds to thousands of feet or more per minute and particle diameters of only a few hundred angstroms.

What is claimed is:

1. A method of determining the suitability of filter media for sampling small particles from particle laden gas at high altitudes and large collection velocities, comprising sequentially passing said particle laden gas through said filter media and by-passing said particle laden gas around said filter media, electrically charging said particles in said particle laden gas, and measuring the charge carried by said particle laden gas after passing through said filter media and upon by-passing said gas by said filter media.

2. A method for determining the suitability of filter media for sampling small aerosol particles at high altitudes and large collection velocities, comprising introducing said aerosol into clean air in a test means having a vacuum pump for causing said aerosol laden air to pass through said filter media at low pressure and high velocity charging said particles in said particle laden gas, measuring the electric charge carried by said particle laden gas passing through said filter media, and sequentially causing said particle laden air to by-pass said filter and to be charged for measuring the electric charge carried by said by-passed particle laden air.

3. A method for determining the suitability of filter media for sampling small aerosol particles at high altitudes and large collection velocities, comprising sequentially introducing said aerosol into clean air in a chamber, passing said aerosol laden air through an orifice in said chamber whereby the air has low pressure and high velocity on the downstream side of said orifice, removing the electrical charge on said aerosol particles caused by passage through said orifice, causing said air and charge free particles to pass through said filter media, electrically charging said aerosol particles passing through said filter media, removing excess charged particles from said air after passing through said filter and being charged, collecting said particles on charged plates for measuring the charge of said particles collected on said plates, and sequentially causing said air and charge free particles to by-pass said filter media and to be charged for collecting said particles for measuring the electric charge on said particles that by-pass said filter media.

4. A method of determining the suitability of filter media for sampling small aerosol particles at high altitudes and large collection velocities, comprising passing neutral aerosol particle laden gas through said filter media at low pressure and high velocity, and sequentially charging said particles passing through said filter media and causing said particle laden gas to by-pass said filter and to be charged for measuring the charge concentration on said particles upstream and downstream of said filter media, whereby the sum of said measurements are a measure of the sampling ability of said filter media.

5. Apparatus for determining the sampling ability of filter media, comprising test means having a filter for admitting clean air into said test means, means for introducing an aerosol into said clean air, orifice means for lowering the pressure and increasing the velocity of said aerosol laden air in said test means, means for removing charged particles from said aerosol laden air to produce an electrically neutral gas stream, means for flowing said electrically neutral gas stream through said test filter media at said low pressure and large velocity, means for electrically charging the particles remaining in said gas stream on the downstream side of said filter, means for removing excess charged particles from said electrically charged particles in said gas stream, means for measuring the electrical charges carried by particles on the downstream side of said means for removing excess charged particles, and valve means for selectively by-passing said electrically neutral gas stream around said test filter media, said valve means selectively causing said electrically neutral gas stream to flow through said filter and selectively to by-pass said filter for measuring the electrical charges carried by said gas stream upon being filtered and by-passed around said test filter media.

6. The invention of claim 5 having a ballast tank for receiving the gas stream on the downstream side of said means for measuring the electrical charges carried by said particles, and a high vacuum pump connected to said ballast tank for producing low pressure and high gas flow velocities in said test means on the downstream side of said orifice means.

7. The invention of claim 5 having means for measuring the pressure drop across said test filter means which is in operable association with said valve means for equalizing the pressure and flow in said test means from said orifice means to said means for measuring the electrical charges carried by said particles.

References Cited
UNITED STATES PATENTS

| | | | |
|---|---|---|---|
| 1,411,796 | 4/1922 | Meyer | 73—194 |
| 2,149,847 | 3/1939 | Kolin | 324—33 |
| 2,611,268 | 9/1952 | Mellen | 73—194 |
| 2,986,923 | 6/1961 | Vonnegut | 73—28 |
| 3,011,335 | 12/1961 | Skarstrom | 73—26 |

S. CLEMENT SWISHER, *Acting Primary Examiner.*

LOUIS R. PRINCE, *Examiner.*

WILLIAM HENRY, *Assistant Examiner.*